United States Patent
Tsao et al.

(10) Patent No.: US 10,620,849 B2
(45) Date of Patent: Apr. 14, 2020

(54) THIN PROVISIONING STORAGE DEVICE

(71) Applicant: AccelStor, Inc., Taipei (TW)

(72) Inventors: Shih-Chiang Tsao, Taipei (TW); Ting-Fang Chien, Taipei (TW)

(73) Assignee: ACCELSTOR LTD., New Taipei (TW)

( * ) Notice: Subject to any disclaimer, the term of this patent is extended or adjusted under 35 U.S.C. 154(b) by 91 days.

(21) Appl. No.: 15/805,244

(22) Filed: Nov. 7, 2017

(65) Prior Publication Data
US 2019/0102092 A1    Apr. 4, 2019

(30) Foreign Application Priority Data
Sep. 30, 2017   (CN) .......................... 2017 1 0913537

(51) Int. Cl.
*G06F 3/06*    (2006.01)

(52) U.S. Cl.
CPC ............ *G06F 3/0617* (2013.01); *G06F 3/067* (2013.01); *G06F 3/0631* (2013.01); *G06F 3/0644* (2013.01); *G06F 3/0659* (2013.01); *G06F 3/0665* (2013.01)

(58) Field of Classification Search
None
See application file for complete search history.

(56) References Cited

U.S. PATENT DOCUMENTS

| | | | | |
|---|---|---|---|---|
| 7,584,339 B1 * | 9/2009 | Bingham | ............ | G06F 11/1464 711/161 |
| 8,527,723 B1 * | 9/2013 | Kasako | ................. | G06F 3/0607 711/161 |
| 2013/0246702 A1 * | 9/2013 | Shigeta | ............... | G06F 12/0223 711/112 |
| 2014/0189212 A1 * | 7/2014 | Slaight | ................ | G06F 12/0866 711/103 |
| 2016/0188211 A1 * | 6/2016 | Song | ..................... | G06F 3/0631 711/114 |

OTHER PUBLICATIONS

NVM Express, Inc. "NVM express revision 1.3". May 2017. pp. 1-282. Wakefield, MA. Website: <https://nvmexpress.org/wp-content/uploads/NVM_Express_Revision_1.3.pdf>. (Year: 2017).*

* cited by examiner

*Primary Examiner* — Reginald G Bragdon
*Assistant Examiner* — James J. Thomas
(74) *Attorney, Agent, or Firm* — McClure, Qualey & Rodack, LLP.

(57) ABSTRACT

A distributed storage device includes a control unit and a plurality of storage units. The control unit has a network interface, to receive a work instruction sent by at least one user end via a network. Each storage unit supports a non-volatile memory host controller interface (NVMHCI) specification and includes at least one non-volatile memory and a storage controller. The storage controller is capable of performing an operation on the at least one non-volatile memory according to the work instruction, to share operation resources of the control unit. The operation may be thin provisioning that establishes a physical volume and a logical volume for the storage unit.

6 Claims, 5 Drawing Sheets

THIN PROVISIONING STORAGE DEVICE

CROSS-REFERENCE TO RELATED APPLICATION

This non-provisional application claims priority under 35 U.S.C. § 119(a) to Patent Application No. 201710913537.0 filed in China, P.R.C. on Sep. 30, 2017, the entire contents of which are hereby incorporated by reference.

BACKGROUND

Technical Field

The present invention relates to a storage device, and in particular, to a distributed storage device.

Related Art

Referring to FIG. 1, FIG. 1 is a schematic diagram of an existing distributed storage architecture. The existing distributed storage architecture 100 may store data jointly by multiple computer devices, that is, multiple control units (control units 111 and 112 are used as an example herein) jointly manage multiple storage units 120 (120_1 to 120_N, N being a positive integer, are used as an example herein). For example, the control unit 111 is responsible for managing a part of the storage units 120 (such as a storage unit 120_1, a storage unit 120_2, and a storage unit 120_3), and the control unit 112 is responsible for managing a part of the storage units 120 (such as a storage unit 120_4 and a storage unit 120_5). Thus, multiple user ends (user ends 201 and 202 are used as an example herein) may be allowed to access data stored in the storage units 120.

For example, when the user end 201 needs space to store data and the needed space is, for example, 6 TB, the control unit 111 will calculate the size of the space of the storage units 120_1 to 120_3 that the control unit 111 is responsible for managing, to establish a 6 TB volume 131 by means of thin provisioning. When the user end 202 additionally needs, for example, 4 TB space, the control unit 112 will calculate the size of the space of the storage units 120_4 to 120_5 that the control unit 112 is responsible for managing, to establish a 4 TB volume 132 by means of thin provisioning.

Furthermore, if the user end 201 needs a clone volume 131 to establish an identical volume 133, the control unit 111 needs to spend a memory with a 12 TB capacity in recording a correspondence (or referred to as metadata) between the volumes 131 and 133 and the storage units 120_1 to 120_3. Similarly, if the user end 202 needs a clone volume 132 to establish an identical volume 134, the control unit 111 needs to spend a memory with an 8 TB capacity in recording a correspondence between the volumes 132 and 134 and the storage units 120_4 to 120_5.

Based on the above, although the existing distributed storage architecture 100 has multiple control units 111 and 112 to share calculation load of data flows, it still needs to be responsible for delivering a large quantity of command control flows, and load cannot be effectively alleviated due to impact of the network speed. Besides, huge memory resources need to be spent in recording metadata, and in the case of outage, the recorded metadata no longer exists.

SUMMARY

An embodiment of the present invention provides a distributed storage device, including a control unit and a plurality of storage units coupled to the control unit. The control unit has a network interface, to receive a work instruction sent by at least one user end via a network. Each of the storage units supports a non-volatile memory host controller interface (NVMHCI) specification and includes at least one non-volatile memory and a storage controller coupled to each other. The storage controller is capable of performing an operation on the non-volatile memory according to the work instruction, and the operation is thin provisioning. The thin provisioning establishes, for the storage unit, a physical volume and a logical volume whose capacity is greater than that of the physical volume.

In an embodiment, the storage controller of the storage unit performs space calculation of the thin provisioning.

In an embodiment, the control unit further forms a combined volume according to the logical volumes of at least one part of the storage units, where the logical volumes making up the identical combined volume store an identical unique code. Thus, the control unit is capable of restoring the combined volume according to the logical volumes having the identical unique code.

In an embodiment, the storage units are divided into at least a first group and a second group, and the control unit generates a first combined volume by using the storage units in the first group and generates a second combined volume by using the storage units in the second group. The first combined volume has first available physical space (FPS_1) and first available logical space (FLS_1), the second combined volume has second available physical space (FPS_2) and second available logical space (FLS_2), and when performing thin provisioning again according to expanded space, the control unit expands the first combined volume and the second combined volume according to a ratio that is (FPS_1/FLS_1):(FPS_2/FLS_2).

In another embodiment, when performing thin provisioning again according to expanded space, the control unit expands the first combined volume and the second combined volume according to a ratio relationship between the first available physical space and the second available physical space or according to a ratio relationship between the first available logical space and the second available logical space.

In an embodiment, when performing thin provisioning again according to the expanded space, the control unit first determines whether a sum of the first available physical space and the second available physical space exceeds a threshold, if the sum exceeds the threshold, expands the first combined volume and the second combined volume according to the ratio relationship between the first available logical space and the second available logical space, and if the sum is lower than the threshold, expands the first combined volume and the second combined volume according to the ratio relationship between the first available physical space and the second available physical space.

In an embodiment, the operation is further a clone volume or a redundant array of independent disks (RAID). When the operation is the RAID, the user end performs XOR operation. When the operation is the clone volume, the storage controller of the storage unit performs space calculation of the clone volume.

Based on the above, the distributed storage device according to the embodiments of the present invention can reduce calculation load of the control unit, can save memory resources and balance writing space, and can avoid data errors or damage caused by outage.

DETAILED DESCRIPTION

Figure 1:
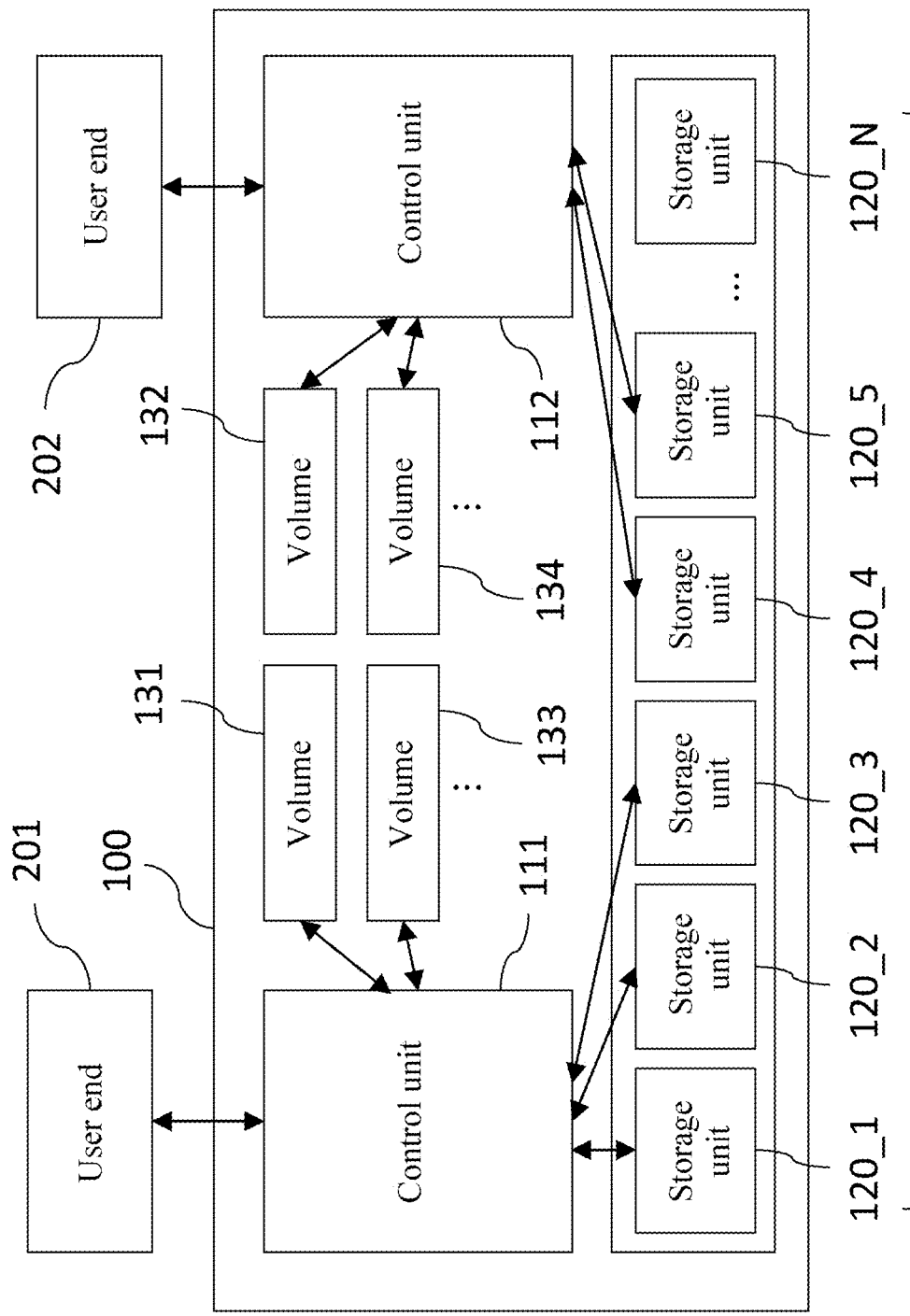
FIG. 1 is a schematic diagram of an existing distributed storage architecture.
Figure 2:
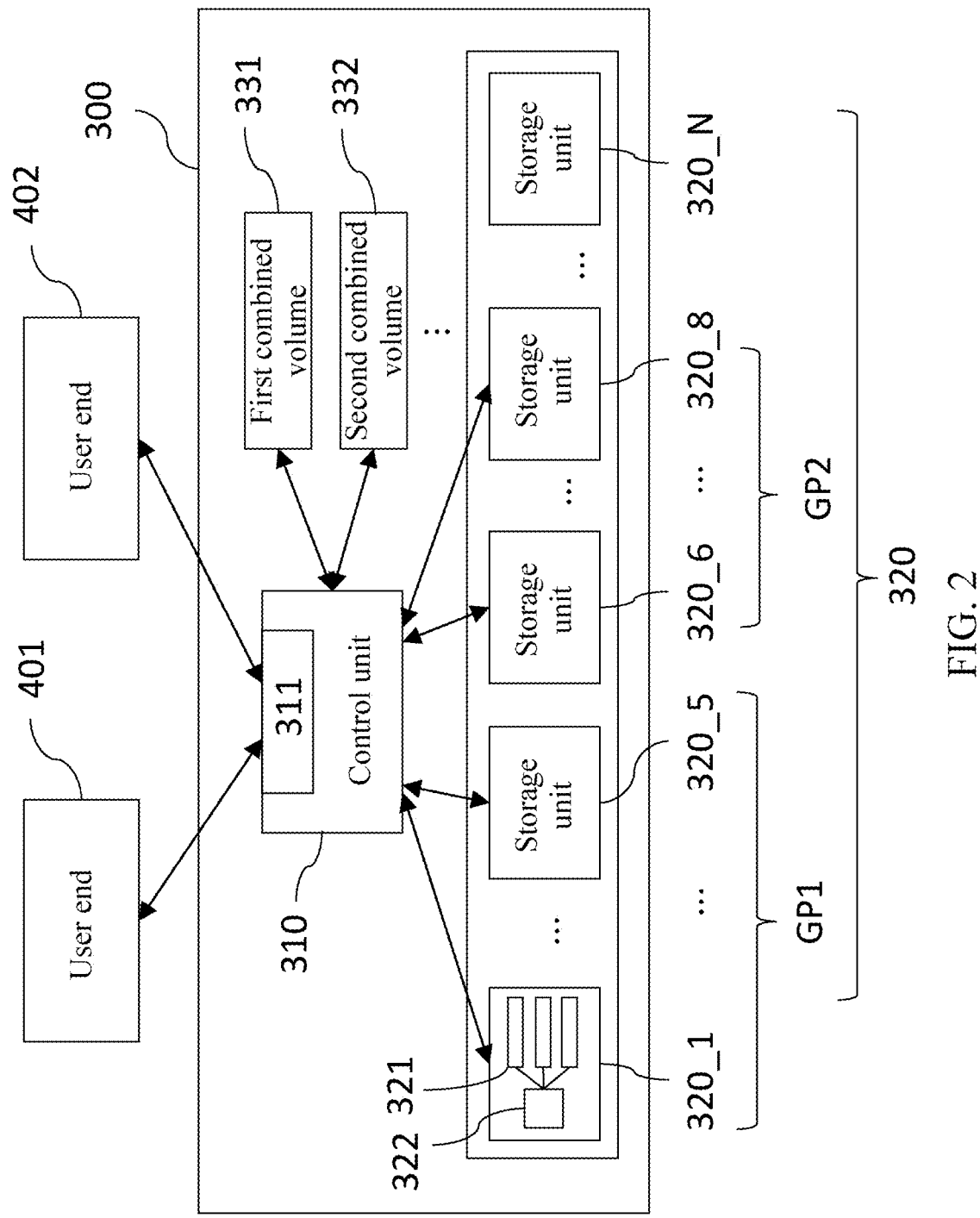
FIG. 2 is a schematic diagram of an architecture of a distributed storage device according to an embodiment of the present invention.

Referring to FIG. 2, FIG. 2 is a schematic diagram of an architecture of a distributed storage device 300 according to an embodiment of the present invention. The distributed storage device 300 includes a control unit 310 and a plurality of storage units 320 (denoted by 320_1 to 320_N, N being a positive integer).

The control unit 310 has a network interface 311 and may receive a work instruction sent by at least one user end (which are two end users 401 and 402 herein) via a network. The storage unit 320 is coupled to the control unit 310. Each storage unit 320 supports an NVMHCI specification that may be referred to as the NVMe protocol, and may support dynamic multiple namespaces, volume establishment and other actions. The storage unit 320 may be a solid state drive. The storage unit 320 includes at least one non-volatile memory 321 and a storage controller 322 coupled to each other. The storage controller 322 may perform actions such as reading, writing, and erasing on the non-volatile memory 321, and execute a particular wear leveling algorithm, to prolong the service life of the non-volatile memory 321. Besides, the storage controller 322 may perform an operation on the non-volatile memory 321 according to the work instruction, and the operation may be thin provisioning. The thin provisioning establishes, for the storage unit 320, a physical volume and a logical volume whose capacity is greater than that of the physical volume. For example, a 2 TB physical volume and a 3 TB logical volume may be established for a hard disk with a 2 TB capacity. The size of the physical volume is greater than or equal to a storage capacity of the hard disk (all the non-volatile memory 321 in the hard disk).

Figure 3:
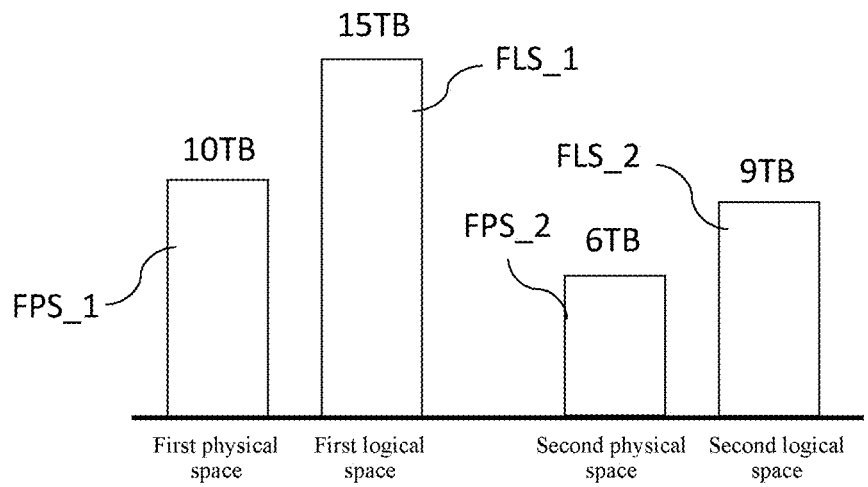
FIG. 3 is a first schematic diagram of thin provisioning according to an embodiment of the present invention.

In an embodiment, the control unit 310 may form a combined volume according to the logical volumes of at least one part of the storage units 320. For example, as shown in FIG. 2, the storage units 320 are divided into a first group GP1 and a second group GP2. The first group GP1 includes five storage units (that is, 320_1 to 320_5), and the second group GP2 includes three storage units (that is, 320_6 to 320_8). Referring to both FIG. 2 and FIG. 3, FIG. 3 is a first schematic diagram of thin provisioning according to an embodiment of the present invention. The control unit 310 generates a first combined volume 331 by using the storage units 320 in the first group GP1, and generates a second combined volume 332 by using the storage units 320 in the second group GP2. The first combined volume 331 has first available physical space FPS_1 and first available logical space FLS_1. The second combined volume 332 has second available physical space FPS_2 and second available logical space FLS_2. In a process of thin provisioning, the storage controller 322 of the storage unit 320 performs space calculation of the thin provisioning, and the control unit 310 simplifies the logical volume provided by the storage unit 320 into a combined volume. Thus, the operation load of the control unit 310 can be shared. According to the foregoing example of establishing a 2 TB physical volume and a 3 TB logical volume for a hard disk, after initialization of thin provisioning, the first available physical space FPS_1 is 10 TB, the first available logical space FLS_1 is 15 TB, the second available physical space FPS_2 is 6 TB, and the second available logical space FLS_2 is 9 TB.

Figure 4:
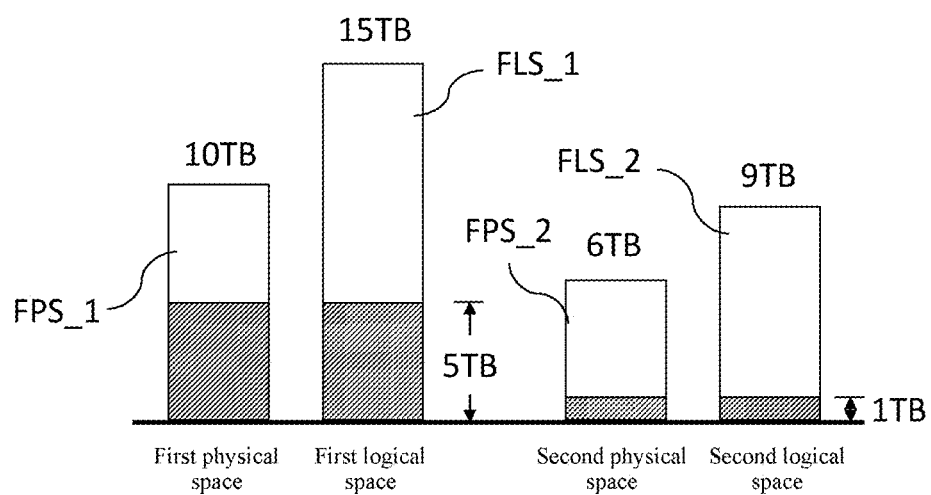
FIG. 4 is a first schematic diagram of use of storage space according to an embodiment of the present invention.

Referring to FIG. 4, FIG. 4 is a first schematic diagram of use of storage space according to an embodiment of the present invention. When the user end 401 writes data to the first combined volume 331 and the second combined volume 332, for example, the first combined volume 331 uses 5 TB and the second combined volume 332 uses 1 TB (the diagonal part), the first available physical space FPS_1 has 5 TB left, the first available logical space FLS_1 has 10 TB left, the second available physical space FPS_2 has 5 TB left, and the second available logical space FLS_2 has 8 TB left (the blank part).

Figure 5:
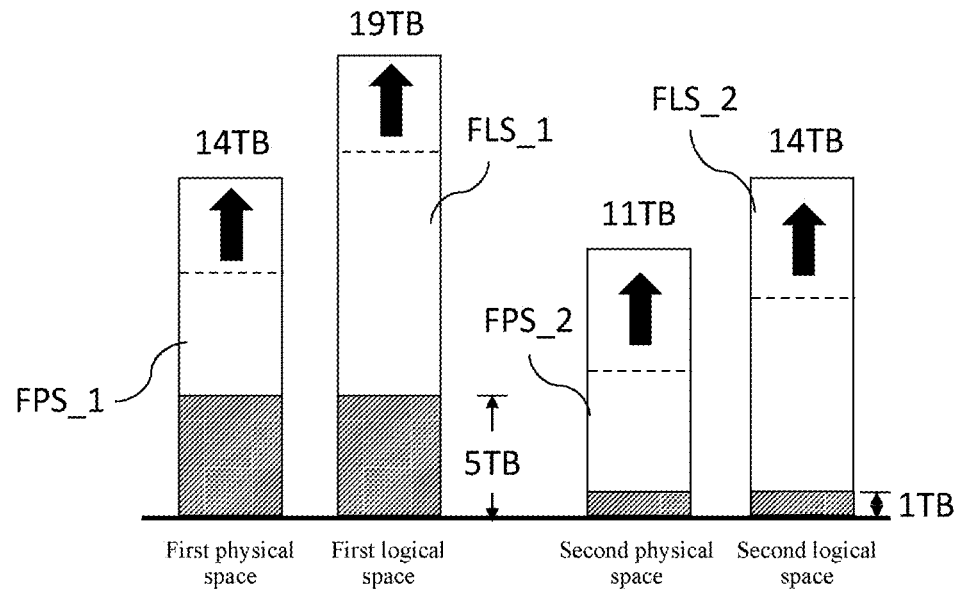
FIG. 5 is a second schematic diagram of thin provisioning according to an embodiment of the present invention.

When the user end 401 has a storage demand and needs to additionally expand the storage space, the control unit 310 performs thin provisioning again according to demanded expanded space in response to the demand. In this case, the first combined volume 331 and the second combined volume 332 are expanded according to a ratio that is (FPS_1/FLS_1):(FPS_2/FLS_2), and the ratio may be dynamically adjusted. For example, if the expanded space requested by the user end 401 is 9 TB, the ratio is (5 TB/10 TB):(5 TB/8 TB), that is, 4:5. Therefore, as shown in FIG. 5, the first combined volume 331 is expanded by a 4 TB capacity, and the second combined volume 332 is expanded by a 5 TB capacity (the arrow part denotes an expanded capacity, and the dotted line denotes a capacity before expansion). Then, the first available physical space FPS_1 has 9 TB left, the first available logical space FLS_1 has 14 TB left, the second available physical space FPS_2 has 10 TB left, and the second available logical space FLS_2 has 13 TB left (the blank part).

An allocation manner of the expanded space can dynamically adjust the ratio, but may result in that space is cut to be relatively broken. Hereinafter, another allocation manner of the expanded space that can reduce the breakage degree of the space cutting will be illustrated. The first combined volume 331 and the second combined volume 332 are expanded according to a ratio relationship between the first available physical space FPS_1 and the second available physical space FPS_2 or according to a ratio relationship between the first available logical space FLS_1 and the second available logical space FLS_2.

Figure 6:
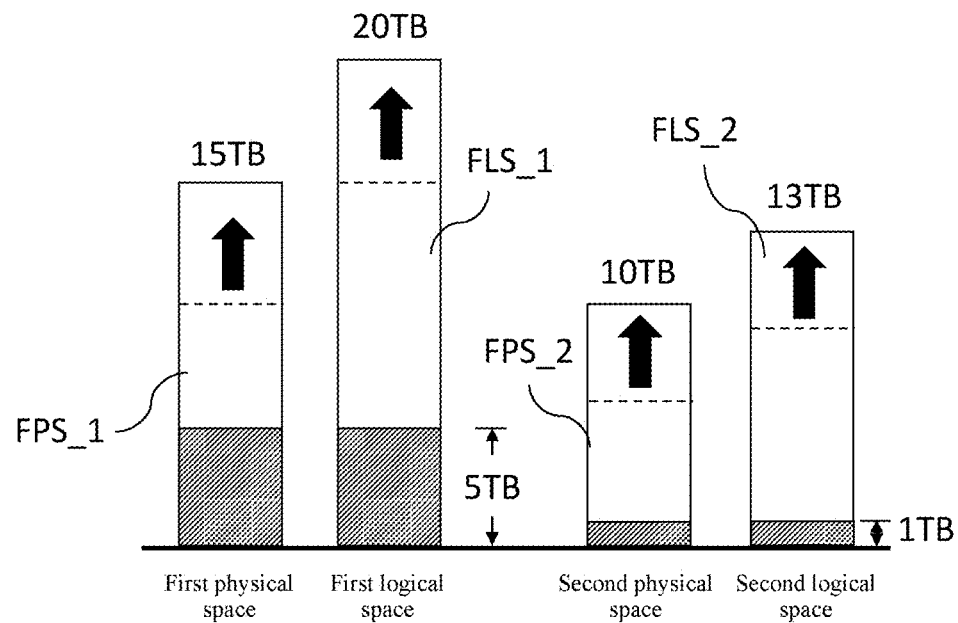
FIG. 6 is a third schematic diagram of thin provisioning according to an embodiment of the present invention.

First, the manner in which the first combined volume 331 and the second combined volume 332 are expanded according to a ratio relationship between the first available physical space FPS_1 and the second available physical space FPS_2 is described. Referring to both FIG. 4 and FIG. 6, FIG. 6 is a third schematic diagram of thin provisioning according to an embodiment of the present invention.

When performing thin provisioning again according to the expanded space, the control unit 310 first determines whether a sum of the first available physical space FPS_1 and the second available physical space FPS_2 exceeds a threshold. As shown in FIG. 4, the first available physical space FPS_1 is 5 TB, and the second available physical space FPS_2 is 5 TB. Therefore, the sum of the first available physical space FPS_1 and the second available physical space FPS_2 is 10 TB. A threshold may be set to, for example, 50% of total physical space, that is, (10 TB+6 TB)*50%=8 TB. In this case, the sum of the first available physical space FPS_1 and the second available physical space FPS_2 exceeds the threshold, and then the first combined volume 331 and the second combined volume 332 are expanded according to the ratio relationship between the first available logical space FLS_1 and the second available logical space FLS_2. The first available logical space FLS_1 is 10 TB, and the second available logical space FLS_2 is 8 TB. If the expanded space requested by the user end 401 is 9 TB, the ratio is 10 TB:8 TB, that is, 5:4. Therefore, as shown in FIG. 6, the first combined volume 331 is expanded by a 5 TB capacity, and the second combined volume 332 is expanded by a 4 TB capacity (the arrow part denotes an expanded capacity, and the dotted line denotes a capacity before expansion). Then, the first available physical space FPS_1 has 10 TB left, the first available logical space FLS_1 has 15 TB left, the second available physical space FPS_2 has 9 TB left, and the second available logical space FLS_2 has 12 TB left (the blank part).

Figure 7:
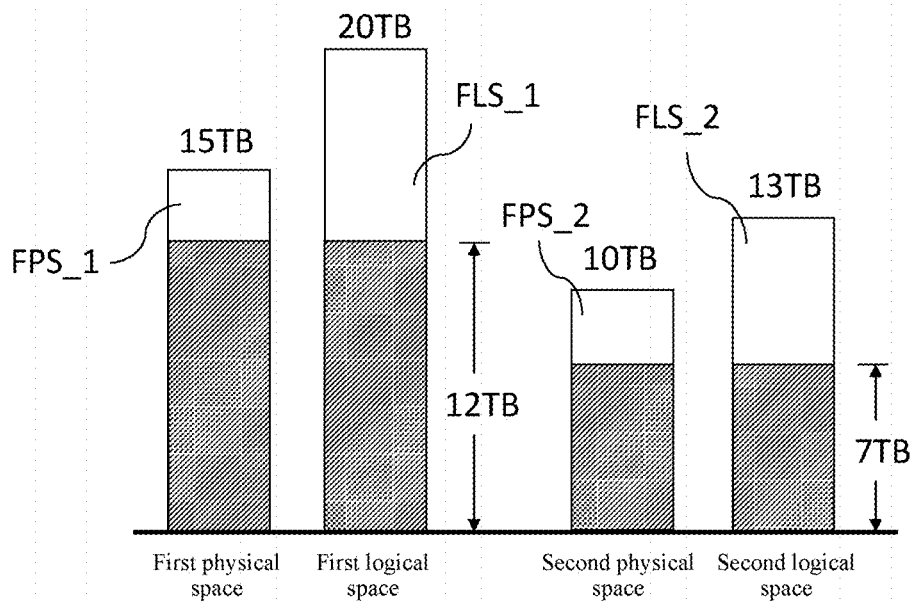
FIG. 7 is a second schematic diagram of use of storage space according to an embodiment of the present invention.
Figure 8:
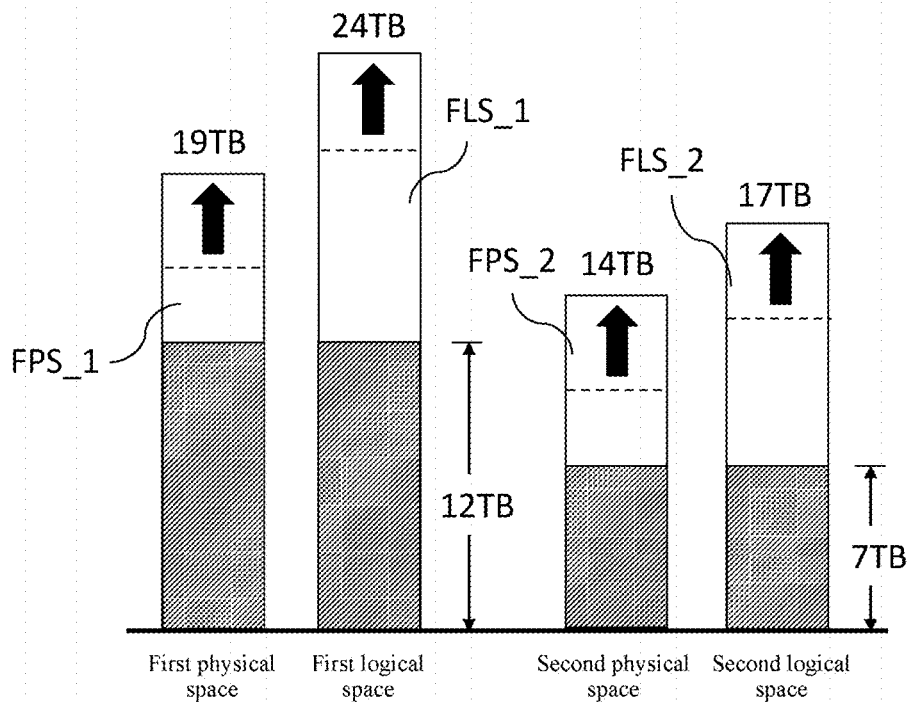
FIG. 8 is a fourth schematic diagram of thin provisioning according to an embodiment of the present invention.

As shown in FIG. 7, if the user continues storing data such that the first combined volume 331 stores 12 TB data and the second combined volume 332 stores 7 TB data. In this case, the first available physical space FPS_1 has 3 TB left, the first available logical space FLS_1 has 8 TB left, the second available physical space FPS_2 has 3 TB left, and the second available logical space FLS_2 has 6 TB left (the blank part). Therefore, the sum of the first available logical space FLS_1 and the second available physical space FPS_2 is 6 TB and is lower than the foregoing threshold (it is supposed that the threshold is still 50% of the total physical space, that is, (15 TB+10 TB)*50%=12.5 TB), and then the first combined volume 331 and the second combined volume 332 are expanded according to the ratio relationship between the first available physical space FPS_1 and the second available physical space FPS_2. The first available physical space FPS_1 is 3 TB, and the second available physical space FPS_2 is 3 TB. If the expanded space requested by the user end 401 is 8 TB, the ratio is 3 TB:3 TB, that is, 1:1. Therefore, as shown in FIG. 8, the first combined volume 331 is expanded by a 4 TB capacity, and the second combined volume 332 is expanded by a 4 TB capacity (the arrow part denotes an expanded capacity, and the dotted line denotes a capacity before expansion). Then, the first available physical space FPS_1 has 7 TB left, the first available logical space FLS_1 has 12 TB left, the second available physical space FPS_2 has 7 TB left, and the second available logical space FLS_2 has 10 TB left (the blank part).

As shown in FIG. 2, the control unit 310 can form a combined volume according to the logical volumes of at least one part of the storage units 320. In an embodiment, the logical volumes making up the identical combined volume store an identical unique code. As the logical volumes are stored in the non-volatile memory 321 of the storage units 320 and may not be affected by outage, even if outage occurs, after power up, the non-volatile memory 321 still has data stored by the logical volumes. Therefore, after power up, the control unit 310 can restore and combine the combined volume according to the logical volumes having the identical unique code.

In an embodiment, the operation performed by the storage controller 322 on the non-volatile memory 321 according to the work instruction sent by the user end may also be a clone volume, and the storage controller 322 of the storage unit 320 performs space calculation of the clone volume, to share operation load of the control unit 310.

In an embodiment, the operation performed by the storage controller 322 on the non-volatile memory 321 according to the work instruction sent by the user end may also be a RAID, and the user end performs XOR operation. In another embodiment, the control unit 310 may perform XOR operation.

Based on the above, the distributed storage device according to the embodiments of the present invention can reduce calculation load of the control unit 310, can save memory resources and balance writing space, and can avoid data errors or damage caused by outage.

What is claimed is:

1. A distributed storage device, comprising:
    a control unit having a network interface, to receive a work instruction sent by at least one user end via a network; and
    a plurality of storage units coupled to the control unit, each storage unit supporting a non-volatile memory host controller interface (NVMHCI) specification and comprising at least one non-volatile memory and a storage controller coupled to each other, wherein the storage controller is capable of performing an operation on the at least one non-volatile memory according to the work instruction, and the operation is thin provisioning that establishes, for the storage unit, a physical volume and a logical volume whose capacity is greater than that of the physical volume;
    wherein the control unit further forms a combined volume according to the logical volumes of at least one part of the storage units, and the storage controller of the storage unit performs space calculation of the thin provisioning;
    wherein the storage units are divided into at least a first group and a second group, the control unit generates a first combined volume by using the storage units in the first group and generates a second combined volume by using the storage units in the second group, the first combined volume has first available physical space (FPS_1) and first available logical space (FLS_1), the second combined volume has second available physical space (FPS_2) and second available logical space (FLS_2), and when performing thin provisioning again according to expanded space, the control unit expands the first combined volume and the second combined volume according to a ratio that is (FPS_1/FLS_1):(FPS_2/FLS_2).

2. The distributed storage device according to claim 1, wherein the logical volumes making up the combined volume store an identical unique code.

3. The distributed storage device according to claim 2, wherein the control unit is capable of restoring the combined volume according to the logical volumes having the identical unique code.

4. The distributed storage device according to claim 1, wherein the operation is further to perform space calculation during a volume cloning operation or to perform XOR calculation of a redundant array of independent disks (RAID).

5. A distributed storage device, comprising:
    a control unit having a network interface, to receive a work instruction sent by at least one user end via a network; and
    a plurality of storage units coupled to the control unit, each storage unit supporting a non-volatile memory host controller interface (NVMHCI) specification and comprising at least one non-volatile memory and a storage controller coupled to each other, wherein the storage controller is capable of performing an operation on the at least one non-volatile memory according to the work instruction, and the operation is thin provisioning that establishes, for the storage unit, a physical volume and a logical volume whose capacity is greater than that of the physical volume;

wherein the control unit further forms a combined volume according to the logical volumes of at least one part of the storage units, and the storage controller of the storage unit performs space calculation of the thin provisioning;

wherein the storage units are divided into at least a first group and a second group, the control unit generates a first combined volume by using the storage units in the first group and generates a second combined volume by using the storage units in the second group, the first combined volume has first available physical space and first available logical space, the second combined volume has second available physical space and second available logical space, and when performing thin provisioning again according to expanded space, the control unit expands the first combined volume and the second combined volume according to a ratio relationship between the first available physical space and the second available physical space or according to a ratio relationship between the first available logical space and the second available logical space.

6. The distributed storage device according to claim 5, wherein when performing thin provisioning again according to the expanded space, the control unit first determines whether a sum of the first available physical space and the second available physical space exceeds a threshold, if the sum exceeds the threshold, expands the first combined volume and the second combined volume according to the ratio relationship between the first available logical space and the second available logical space, and if the sum is lower than the threshold, expands the first combined volume and the second combined volume according to the ratio relationship between the first available physical space and the second available physical space.

\* \* \* \* \*

UNITED STATES PATENT AND TRADEMARK OFFICE
CERTIFICATE OF CORRECTION

PATENT NO. : 10,620,849 B2  
APPLICATION NO. : 15/805244  
DATED : April 14, 2020  
INVENTOR(S) : Tsao et al.

Page 1 of 1

It is certified that error appears in the above-identified patent and that said Letters Patent is hereby corrected as shown below:

On the Title Page

Item (73), should read: "Innodisk Corporation"

Signed and Sealed this  
Eleventh Day of August, 2020

Andrei Iancu  
*Director of the United States Patent and Trademark Office*